Patented Jan. 23, 1923.

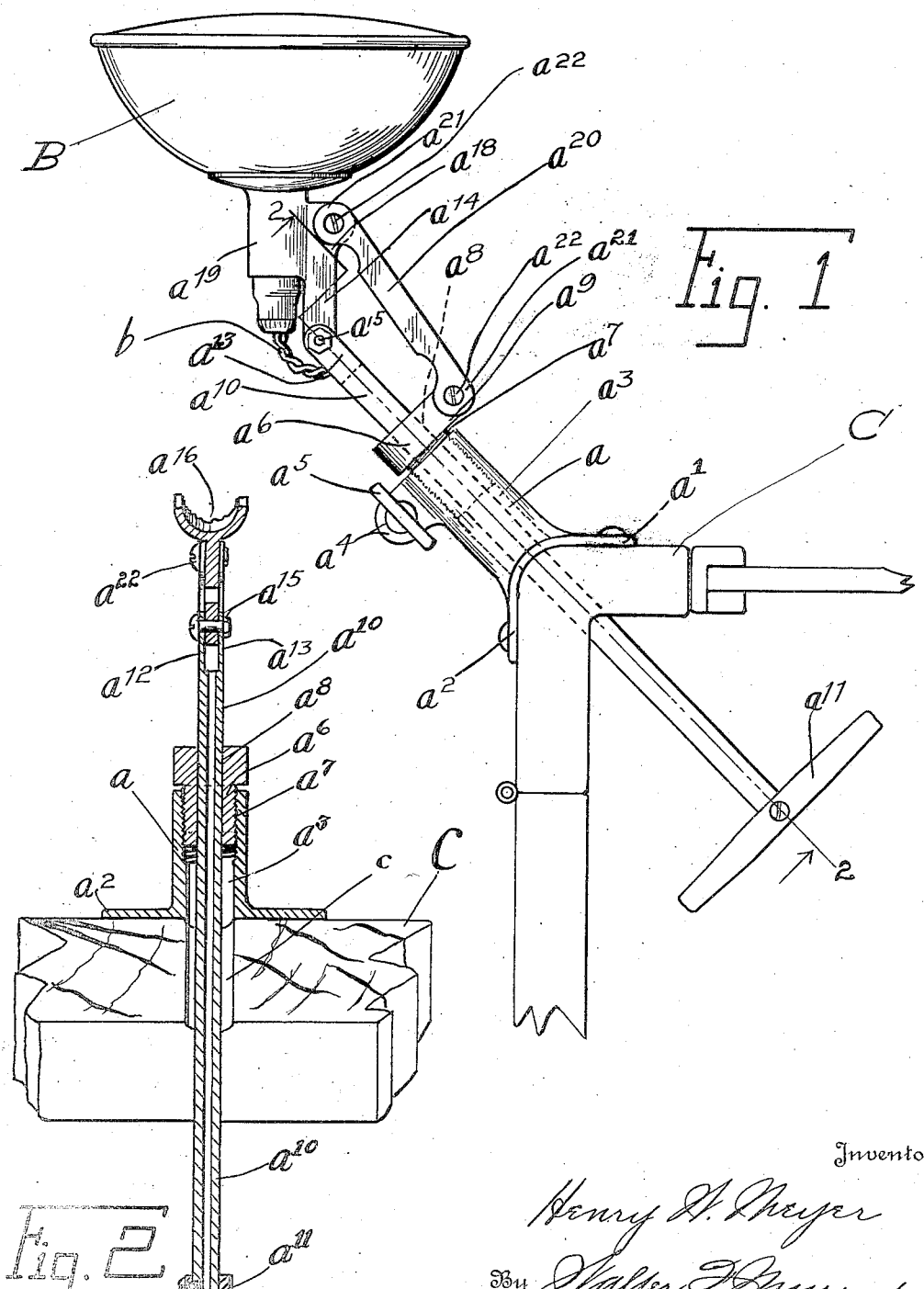

1,443,331

UNITED STATES PATENT OFFICE.

HENRY W. MEYER, OF CINCINNATI, OHIO.

SPOTLIGHT MOUNTING.

Application filed August 23, 1921. Serial No. 494,630.

*To all whom it may concern:*

Be it known that I, HENRY W. MEYER, a citizen of the United States of America, and a resident of Cincinnati, in the county of Hamilton and State of Ohio, have invented a new and useful Improvement in a Spotlight Mounting, of which the following is a specification.

My invention relates to that class of devices employed in mounting spot lights upon coupes and similar vehicles and permitting the manipulation of the splot light from within the coupe.

An object of my invention is to simplify the construction and operation of devices of this nature.

Another object of my invention is to provide a device of the type referred to wherein there will be no substantial weakening of the body of the vehicle as a result of being obliged to provide such body with a bore through which part of the device may enter the interior of the vehicle.

These and other objects are attained by the means described herein and disclosed in the accompanying drawings, in which Fig. 1 is a plane view of a device embodying my invention mounted upon a vehicle body in the nature of a coupe or sedan.

Fig. 2 is a sectional view on line 2—2 of Fig. 1.

The sleeve $a$ has formed upon its one end the flanges $a'$ and $a^2$ disposed at substantially a right angle to one another, whereby the sleeve $a$ may be mounted upon the outside and at the forward corner of a coupe C. The sleeve has an axial bore $a^3$ which registers with a bore $c$ formed through the wall of the coupe. The sleeve is split from the forward end thereof to a point spaced from the flange $a^2$, and on either side of this slot is formed a lug $a^4$. One of the lugs has a blind bore through it and the other has a threaded bore through it, said bores being in alignment. A thumb screw $a^5$ extends through the blind bore and engages the threads in the threaded bore, whereby the two lugs may be drawn towards one another, thereby contracting the split end of the sleeve. The bore in the sleeve, at its forward end, is screw threaded. A nut or collar $a^6$ having a threaded shank $a^7$ formed thereon, engages the forward end of the sleeve, the shank $a^7$ engaging the threaded portion of the bore $a^3$. The nut or collar has a bore $a^8$ extending in axial alignment with the bore $a^3$. The nut has formed upon it a lug $a^9$ having a bore therethrough. A tube shaft $a^{10}$ is mounted slidably in the bore in the sleeve and extends through the nut, the sleeve, and the wall of the coupe. A suitable handle $a^{11}$ is mounted upon the inner end of the tube shaft, whereby the shaft may be reciprocated longitudinally of its length through the nut and be revolubly actuated. The outer end of the tube shaft terminates in two spaced lugs $a^{12}$ and $a^{13}$ having aligned bores extending transversely to the tube shaft and between which is pivotally mounted one end of a bracket $a^{14}$ by means of a bolt $a^{15}$. The bracket $a^{14}$ is elongated and has an outwardly extending lug $a^{18}$ formed at its other end, through which lug is formed a bore $a^{16}$ through which a bolt $a^{22}$ extends. The bracket, on the side opposite to that from which the lug $a^{18}$ extends, is developed into a tube $a^{19}$ adapted to accommodate a spot-light B. A link $a^{20}$ having a U-shaped structure in cross section, has formed at each of its ends a pair of slotted lobes $a^{21}$ which extend toward the tube shaft. The branches of this U-shaped link are spaced at such distance that one each of the pairs of lobes $a^{21}$ will accommodate between them the lugs $a^{18}$ and $a^9$ formed on the bracket $a^{14}$ and collar $a^6$ respectively. The ends of the link $a^{20}$ are pivotally mounted upon the lugs $a^{18}$ and $a^9$ by any suitable means such as the bolts $a^{22}$. The lamp cord $b$ from the spot light B extends through the tube shaft $a^{10}$ into the body of the vehicle. The pivotal connections of the collar, the link, bracket and tube shaft bear such relation that the spot light can at all times be moved about the pivotal mountings $a^{15}$ and $a^{22}$, this regardless of the fact that the pivot $a^{22}$ may assume a position in alignment with the tube shaft $a^{10}$. This is possible because of pivotal mounting $a^{22}$ on collar $a^6$ being spaced from the tube shaft. The collar $a^6$ is rotatively mounted in bore $a^3$, and rotates with shaft $a^{10}$.

By actuating the handle $a^{11}$ revolubly, it is possible to actuate the spot light upward or downward, and by actuating the tube shaft horizontally, the spot light may be actuated in a horizontal plane. By combining the horizontal and rotary movements of the tube shaft, it is possible to move the spot light to practically any position desired except for a cone shaped area of about 60° at its apex. This cone shaped area is so related to the device as to embrace the interior of the coupe, wherefor the operator of the vehicle and spot light can never actuate the spot light so as to be turned upon himself and thereby blind him while driving the machine. The advantage thereof is self evident.

What I claim is:

1. A spot light mounting for vehicles comprising a vehicle wall having an opening therethrough, a sleeve mounted on the exterior of the vehicle wall having an axial bore in alignment with the opening in the wall, a collar revolubly mounted on the sleeve, a rod mounted in the sleeve adapted to be reciprocated therethrough and to revolubly actuate the collar and extending through the collar, the sleeve and the opening in the wall, a bracket pivotally mounted on the end of the rod adjacent the sleeve, a spot light mounted on the bracket, and a link pivotally mounted on the bracket and the collar.

2. A spot light mounting for vehicles comprising a vehicle wall having an opening therethrough, a flanged sleeve adapted to be mounted upon the exterior of the vehicle wall and having a bore in alignment with the opening in the wall, a collar having a bore revolubly mounted on the sleeve, a tube shaft mounted reciprocally in the bore in the collar and extending through the collar, the sleeve and the vehicle wall, a bracket pivotally mounted on the tube shaft, a spot light mounted on the bracket, a lamp cord extending through the tube shaft and connected with the spot light, and a link pivotally mounted on the bracket and on the collar.

3. In a device of the class described the combination of a vehicle wall having a bore therethrough, a sleeve, fixedly mounted on the wall having a bore in axial alignment with the bore in the wall, a collar revolubly mounted on the sleeve, a shaft reciprocally mounted in the sleeve and collar, a link having one end pivotally mounted on the collar and a spot light having a pivotal mounting on the other end of the link and a second pivotal mounting on the shaft.

4. In a device of the class described the combination of a collar having a bore, a vehicle wall having a bore therethrough, and provided with means to rotatively mount the collar with the bore in the collar in axial alignment with the bore in the vehicle wall, a shaft extending reciprocally through the bores in the wall and the collar, a link having one end pivotally mounted on the collar, and a spot light having a pivotal mounting on the other end of the link and a second pivotal mounting on the shaft.

In testimony whereof, I have hereunto subscribed my name this 10th day of August, 1921.

HENRY W. MEYER.